United States Patent
Yashiki

(10) Patent No.: US 9,889,699 B2
(45) Date of Patent: Feb. 13, 2018

(54) UNISOMETRIC REFLECTION DISPLAY, INFORMATION HOLDER USING UNISOMETRIC REFLECTION DISPLAY

(71) Applicant: TOPPAN PRINTING CO., LTD., Tokyo (JP)

(72) Inventor: Kazuhiro Yashiki, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 198 days.

(21) Appl. No.: 14/543,171

(22) Filed: Nov. 17, 2014

(65) Prior Publication Data

US 2015/0070775 A1     Mar. 12, 2015

Related U.S. Application Data

(63) Continuation of application No. PCT/JP2013/065079, filed on May 30, 2013.

(30) Foreign Application Priority Data

Jun. 1, 2012  (JP) ................. 2012-125984

(51) Int. Cl.
  *G02B 27/14*   (2006.01)
  *B42D 25/45*   (2014.01)
  (Continued)

(52) U.S. Cl.
  CPC ............. *B42D 25/45* (2014.10); *B42D 25/00* (2014.10); *B42D 25/351* (2014.10); *B42D 25/373* (2014.10); *G02B 17/006* (2013.01)

(58) Field of Classification Search
  CPC .... G02B 17/006; G02B 17/00; B42D 25/351; B42D 25/373; B42D 25/00
  See application file for complete search history.

(56) References Cited

U.S. PATENT DOCUMENTS

3,887,742 A   6/1975  Reinnagel
8,054,471 B2  11/2011 Kim et al.
(Continued)

FOREIGN PATENT DOCUMENTS

DE        42 26 907 A1    2/1994
DE   10 2006 021 961 A1  11/2007
(Continued)

OTHER PUBLICATIONS

PCT International Preliminary Report on Patentability dated Dec. 11, 2014 in corresponding International Patent Application No. PCT/JP2013/065079.
(Continued)

*Primary Examiner* — Joseph P Martinez

(57) ABSTRACT

A unisometric reflection display having a light transmissivity includes reflectors included in a reflector holding layer of a thin film form. The reflectors incline at a fixed direction and a fixed angle to a plane of the reflector holding layer. Light incident from a first direction is reflected on a front surface of a reflector to be inhibited from transmitting through the reflector holding layer. Light incident from a second direction to a reflector is reflected on a front surface of the reflector and a rear surface of another reflector adjacent the reflector at a front surface side, or reflected this way a plurality of times to transmit through the reflector holding layer.

7 Claims, 9 Drawing Sheets

(51) Int. Cl.
*G02B 17/00* (2006.01)
*B42D 25/00* (2014.01)
*B42D 25/351* (2014.01)
*B42D 25/373* (2014.01)

(56) References Cited

U.S. PATENT DOCUMENTS

| | | | |
|---|---|---|---|
| 9,016,726 B2* | 4/2015 | Rauch | B42D 25/29 |
| | | | 283/85 |
| 2006/0198998 A1* | 9/2006 | Raksha | G02B 5/09 |
| | | | 428/323 |
| 2012/0064303 A1* | 3/2012 | Yashiki | G02B 5/1842 |
| | | | 428/172 |
| 2012/0228860 A1 | 9/2012 | Rauch et al. | |

FOREIGN PATENT DOCUMENTS

| | | |
|---|---|---|
| DE | 10 2006 050 047 A1 | 4/2008 |
| DE | 10 2009 053 925 A1 | 5/2011 |
| EP | 1 710 756 A1 | 10/2006 |
| JP | 5-212344 | 8/1993 |
| JP | 2002-23271 | 1/2002 |
| JP | 2003-131218 | 5/2003 |
| JP | 2005-55773 | 3/2005 |
| JP | 2005-115176 | 4/2005 |
| JP | 2006-293358 | 10/2006 |
| JP | 2007-24698 | 2/2007 |
| JP | 2008-241759 | 10/2008 |
| JP | 2009-80288 | 4/2009 |
| JP | 2009-516225 | 4/2009 |
| JP | 2011-521090 | 7/2011 |
| JP | 2011-221054 | 11/2011 |
| JP | 4868090 | 2/2012 |
| WO | WO 2006/025317 A1 | 3/2006 |
| WO | WO 2011/018982 A1 | 2/2011 |
| WO | WO 2011/060910 A1 | 5/2011 |

OTHER PUBLICATIONS

International Search Report dated Aug. 27, 2013, in corresponding International Patent Application No. PCT/JP2013/065079.
Extended European Search Report dated May 7, 2015 in corresponding European Patent Application No. 13797045.5.
Mexican Office Action dated Feb. 17, 2017 in corresponding Mexican Patent Application No. MX/a/2014/014362.
European Office Action dated Dec. 14, 2016 in corresponding European Patent Application No. 13 797 045.5.
Japanese Office Action dated May 9, 2017 in corresponding Japanese Patent Application No. 2014-518730.

* cited by examiner

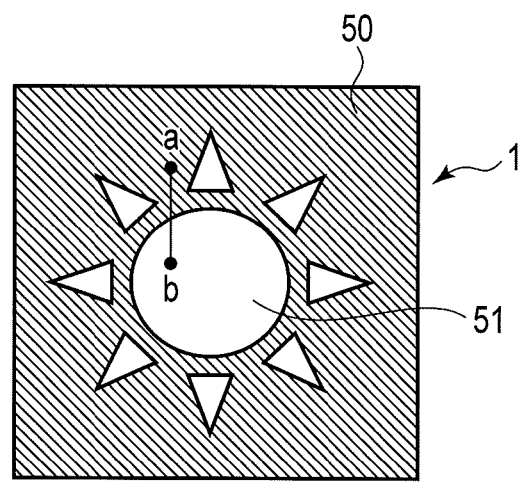
F I G. 10
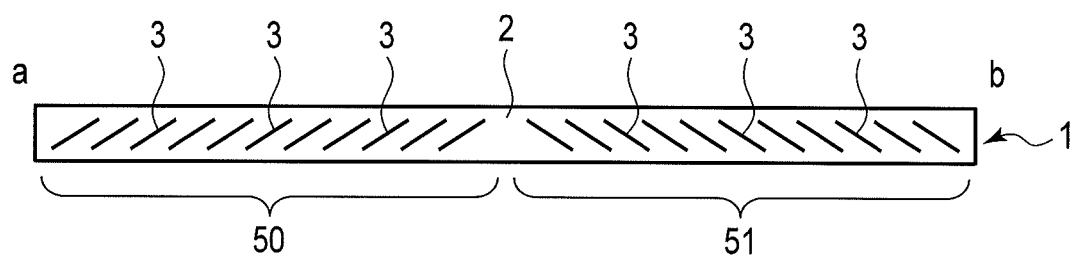
F I G. 11

UNISOMETRIC REFLECTION DISPLAY, INFORMATION HOLDER USING UNISOMETRIC REFLECTION DISPLAY

CROSS REFERENCE TO RELATED APPLICATIONS

This application is a Continuation Application of PCT Application No. PCT/JP2013/065079, filed May 30, 2013 and based upon and claiming the benefit of priority from Japanese Patent Application No. 2012-125984, filed Jun. 1, 2012, the entire contents of all of which are incorporated herein by reference.

BACKGROUND OF THE INVENTION

1. Field of the Invention

The present invention relates to a unisometric reflection display for forgery prevention with special optical effects which is used for identification cards, passports, bills, etc., and more particularly relates to a unisometric reflection display which has fine reflectors inclined at a particular angle and an information holder in which that display is stacked on a print layer.

2. Description of the Related Art

It is desired that items, such as securities, certificates, brand-name goods, electronic devices, and personal identification media are difficult to be forged. To this end, such items may be provided with a display with excellent effects for preventing forgery.

Many of such displays include fine structures, such as a diffraction grating and a hologram, and have an effect to change in color in accordance with, for example, an angle at which they are observed. These displays with fine structures are difficult to be analyzed and forged. Therefore, they can demonstrate outstanding advantages for forgery prevention.

Moreover, these displays are used while bonded on a print layer on which identification information for items is printed, and therefore they have a feature of allowing visible light to go through them. The displays with such transparency are manufactured by applying a transparent high-refraction material along a jagged part of a fine structure.

For example, Jpn. Pat. Appln. KOKAI Publication No. 2011-221054 describes a transparent hologram in which zinc sulfide, which is a transparent high-refraction material, is dry-coated on an uneven pattern surface by a diffraction grating. Japanese Patent No. 4868090 describes a transparent hologram with a more complicated structure of layers.

Furthermore, Patent Jpn. Pat. Appln. KOKAI Publication No. 5-212344 official report discloses a technique to print a powdered magnetic material oriented by magnetic lines of force, and Patent Jpn. PCT National Publication No. 2011-521090 discloses a scale pigment which uses a carbonyl iron powder which can be oriented with magnetism as a base material.

BRIEF SUMMARY OF THE INVENTION

Advancements in embossing techniques in recent years have lowered the difficulty of producing fine structures. Moreover, multilayer thin films and rainbow films utilizing a diffraction grating have begun to be commercially available as common films for packing, which is making it relatively easy to obtain optical effects similar to those obtained with the above fine structures.

However, the diffraction grating and hologram, etc. using a transparent high-refraction film as described in Jpn. Pat. Appln. KOKAI Publication No. 2011-221054 or Japanese Patent No. 4868090 have a low reflection factor, which makes it difficult to obtain an image with a high contrast or produce a dynamic change in color tone.

In contrast, Jpn. Pat. Appln. KOKAI Publication No. 5-212344 official report discloses a technique to print a powdered magnetic material oriented by magnetic lines of force, Jpn. PCT National Publication No. 2011-521090 discloses scale pigment which uses a carbonyl iron powder which can be oriented with magnetism as a base material, and using such techniques can produce an image with a high contrast or produce a dynamic change in color tone. However, the scale pigments partly overlap due to magnetic orientation and the positions and inclination angles of the scale pigments are unavoidably random, which makes it difficult to obtain transparency in a particular angle. For this reason, it is difficult to observe the print layer on which unique information is described through magnetically-oriented scale pigments which lies over the print layer.

In order to obtain transparency using the techniques to magnetically orient the scale pigments, it is conceivable to decrease the quantity of the scale pigments. However, if the quantity of reflexive scale pigments is decreased, this leads to a lowered reflection factor in a particular direction, which makes it difficult to obtain a high-contrast image.

Moreover, it is difficult to control a magnetic field with fine patterns, and therefore a pattern made through magnetic orientation in turn has a low resolution, and for the same reason it is difficult to make it orientated at a constant angle and to control the structure finely.

A purpose of the present invention is to provide a display on which fine reflectors can be installed with a particular angle in only part in which they are required to be installed. Specifically, it is to provide an unisometric reflection display which has a special effect to make more than one pattern appear only with specific angles to be excellent in forgery prevention, has a transmissivity to allow a print layer on which unique information of an item is described to be observed easily even through the display, and can reflect light incident from a particular direction to provide an optical effect with a high contrast and visibility by a fine jagged structure.

According to a first aspect of the present invention, there is provided a unisometric reflection display having a light transmissivity, including reflectors included in a reflector holding layer of a thin film form, wherein the reflectors incline in a fixed direction and a fixed angle to a plane of the reflector holding layer, and light incident from a first direction is reflected on a front surface of a reflector to be inhibited from transmitting through the reflector holding layer, and light incident from a second direction to a reflector is reflected on a front surface of the reflector and a rear surface of another reflector adjacent the reflector at a front surface side, or reflected this way a plurality of times to transmit through the reflector holding layer.

According to a second aspect of the present invention, there is provided a unisometric reflection display having a light transmissivity, including reflectors included in a reflector holding layer of a thin film form, wherein the reflector holding layer has a plurality of sections divided in a direction of a plane of the reflector holding layer, in each of at least two of the sections, reflectors inside incline in a fixed direction and a fixed angle, and a direction and/or an angle in which reflectors incline differ between the two sections.

The two sections are joined by a transparent area without a reflector.

Alternatively, the two sections are joined by an area with a metallic reflection layer.

Part of the reflectors is metal or a metallic compound, and another part of the reflectors is a transparent reflection layer made of a transparent highly-reflective material.

The reflectors are metal or a metallic compound, have metallic luster, and are able to reflect light.

The reflectors are covered with a transparent protection layer made of a metallic compound.

Inclining reflectors are arranged not to overlap with each other when observed from a direction perpendicular to the plane of the reflector holding layer.

Of the inclining reflectors, an interval of the reflectors in an inclining direction is not constant and no periodicity is formed in positions of the reflectors.

In at least one section of the reflector holding layer, a reflectivity when observed from a first direction is 80% or more, and a transmissivity when observed from a second direction is 50% or more.

In at least one section of the reflector holding layer, a transmissivity when observed from a direction perpendicular to the plane of the reflector holding layer is 50% or more.

There is provided an information holder characterized by comprising a unisometric reflection display and a print layer which are stacked.

In at least one section of the unisometric reflection display, a transmissivity when observed from a direction perpendicular to the plane of the reflector holding layer is 50% or more.

According to the present invention, it is possible to provide a display on which fine reflectors can be installed with a particular angle in only part in which they are required to be installed. Specifically, according to the present invention, it is possible to provide an unisometric reflection display which has a special effect to make more than one pattern appear only with specific angles to be excellent in forgery prevention, has a transmissivity to allow a print layer with on which unique information of an item is described to be observed easily even through the display, and can reflect light incident from a particular direction to provide an optical effect with a high contrast and visibility by a fine jagged structure.

BRIEF DESCRIPTION OF THE SEVERAL VIEWS OF THE DRAWING

FIG. 10 is a plan view illustrating one example of use of a unisometric reflection display according to the embodiments of the present invention.

FIG. 11 is a sectional view of section a-b in FIG. 10.

DETAILED DESCRIPTION OF THE INVENTION

Unisometric reflection displays and information holders according to embodiments of the present invention will now be described in detail with reference to the figures.

Figure 1:
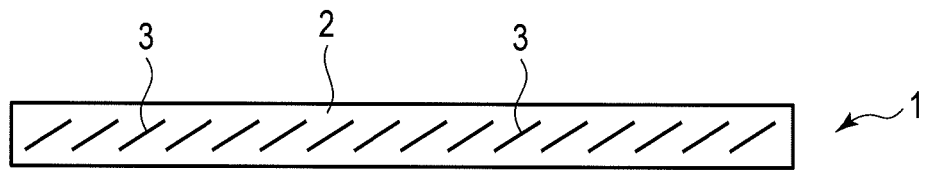
FIG. 1 is a sectional view illustrating a unisometric reflection display according to a first embodiment of the present invention.

FIG. 1 is a sectional view illustrating a unisometric reflection display according to a first embodiment of the present invention.

This unisometric reflection display (1) is configured by a reflector holding layer (2) in a thin film form and more than one reflector (3) included in this reflector holding layer (2). The reflectors (3) are in a line in a plane direction of the reflector holding layer (2) and incline from the plane of the reflector holding layer (2) in one direction to have the same angle of inclination. The reflectors (3) are arranged not to overlap when the unisometric reflection display (1) is observed from a perpendicular direction perpendicular to the plane thereof.

Figure 2:
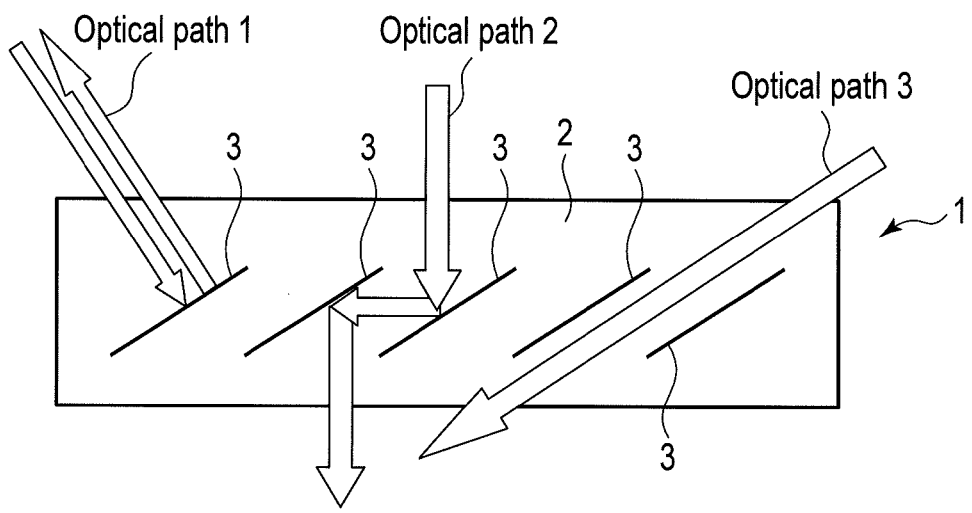
FIG. 2 is a diagram for illustrating optical paths of light incident to the unisometric reflection display of FIG. 1.

FIG. 2 is a diagram for illustrating optical paths of light incident to the unisometric reflection display (1).

Here, a description will be given of optical paths of light incident to the inclining reflectors (3) at different angles.

Optical path 1 illustrates a case in which light incident to a surface of a reflector at a substantial right angle is reflected to the incident direction thereof and does not pass through the reflector holding layer (2). Optical path 2 illustrates a case in which light incident to a reflector (3) at an angle of about 45 degrees is reflected by the front surface of that reflector (3), then by the rear surface of another reflector (3) adjacent the first reflector (3) at the front-surface side, and passes through the reflector holding layer (2). Light may pass through the reflector holding layer (2) by being reflected by front and rear surfaces of inclining reflectors (3) two or more times, and this phenomenon can be simulated by geometrical optics. Optical path 3 illustrates a case in which light is incident substantially in parallel with the inclining direction of the reflectors (3), and passes through the reflector holding layer (2) between reflectors (3).

Thus, the unisometric reflection display (1) according to the first embodiment of the present invention has a property to allow light to pass through the reflector holding layer (2) in the cases of optical paths 2 and 3, and can reflect light only with optical path 1, and it is possible to form the reflectors (3) in a desired pattern to make that pattern appear with optical path 1.

This unisometric reflection display has a light transmitting property over a large range of incident angles, and therefore it is possible to provide a print layer with unique information described thereon below that unisometric reflection display. Such a multi-layer structure can make a reflection image appear with a desired pattern with optical path 1 and allows unique information on the print layer to be observed with optical paths 2 and 3. Using such properties, it can be used for an overlay for ID cards or passports, etc.

Figure 3:
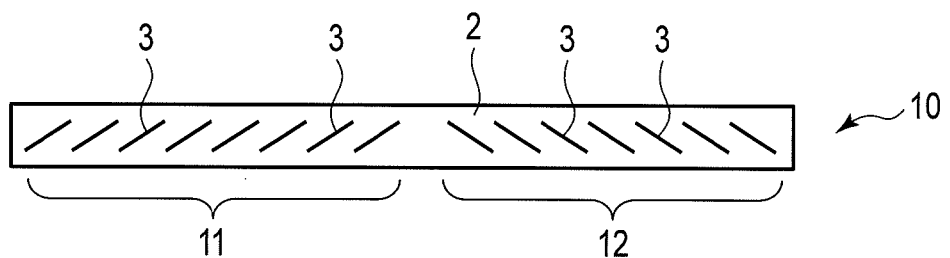
FIG. 3 is a sectional view illustrating a unisometric reflection display according to a second embodiment of the present invention.

FIG. 3 is a sectional view illustrating a unisometric reflection display (10) according to a second embodiment of the present invention.

In this unisometric reflection display (10), the reflector holding layer (2) with reflectors (3) therein has a first section (11) and a second section (12) which are divided in the plane direction of the reflector holding layer (2). The reflectors (3) included in the first section (11) incline to the lower left, and the reflectors (3) included in the second section (12) incline to the lower right, which is different from that of the reflectors (3) of the first section (11). In each of the sections (11, 12), the reflectors (3) incline at a fixed direction and a fixed angle.

This unisometric reflection display (10) produces the same effects as those with the cases of optical paths 1 to 3 in each section (11, 12), and therefore can make two kinds of patterns appear at respective angles: a reflection image of a desired pattern using section (11) and a reflection image of a desired pattern using section (12). The structure which allows for such complex patterns makes forgery difficult, and therefore can be used more effectively as a display for forgery prevention.

Figure 4:
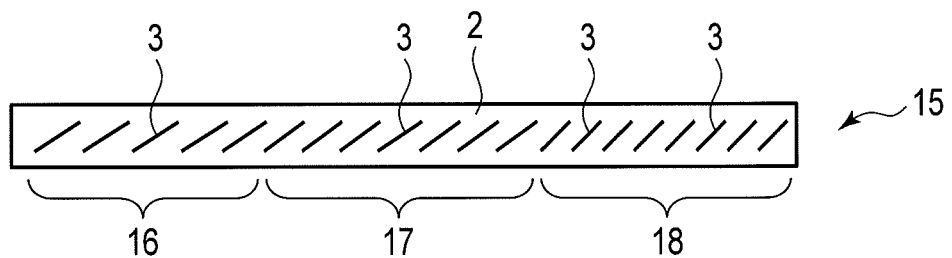
FIG. 4 is a sectional view illustrating a unisometric reflection display according to a third embodiment of the present invention.

FIG. 4 is a sectional view illustrating a unisometric reflection display (15) according to a third embodiment of the present invention.

In this unisometric reflection display (15), the reflector holding layer (2) with reflectors (3) therein has a first section (16), a second section (17), and a third section (18) which are divided in the plane direction of the reflector holding layer (2). The sections (16, 17, 18) have reflectors (3) included therein have respective inclination angles which gradually vary from section (16, 17, 18) to section. In each of the sections (16, 17, 18), the reflectors (3) incline at a fixed direction and a fixed angle.

Thus, this unisometric reflection display (15) has in sections (16, 17, 18) respective reflection angles that vary gradually (incident angles in accordance with optical path 1 varying gradually), and therefore it can produce an effect of reflection images varing sequentially. Such a complex structure also makes forgery difficult, and therefore it can be used as a display for forgery prevention.

Figure 5:
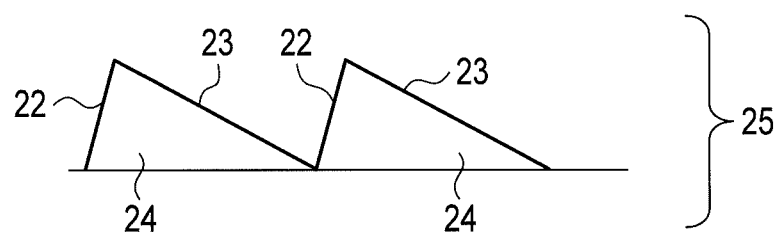
FIG. 5 is a diagram for illustrating a method for manufacturing reflectors of a unisometric reflection display.
Figure 5:
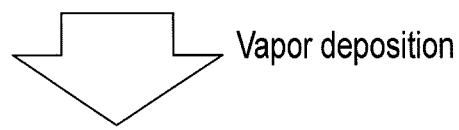
Figure 5:
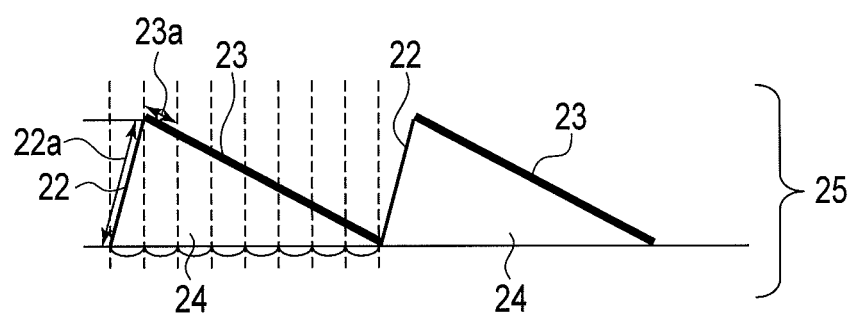

FIG. 5 is a diagram for describing a manufacturing method of inclining reflectors.

First, a fine jagged structure (25) of a shape of a saw blade is formed in which convex portions (24) each made of two slopes (22, 23) inclining at different angles line up on the same plane.

The uneven structure (25) can be formed, for example, by:
1. The heat embossing method in which a metallic mold of a convex relief is pressed onto a resin board to transfer the shape;
2. The cast method in which a melted resin is poured into a metallic mold of a relief with sinks and raisings to mold the jaggedness; or
3. The photopolymer method in which an ultraviolet curable resin is poured between a film substrate and a metallic mold of a relief with sinks and risings, and then the resin is cured by ultraviolet rays through the film substrate.

To a surface of such a saw-blade-shaped jagged structure (25) with convex portions (24) each made of two slopes (22, 23) of different inclination angles, a metal, such as aluminum is vacuum-deposited. This vacuum deposition forms an aluminum film with thicknesses different on the slopes (22, 23) of each convex portion (24).

This results from a high degree of straightness in vacuum deposition. In the same plane perpendicular to a direction in which evaporation deposition occurs, the amount of deposited aluminum per unit area is constant. A section (22a) of a slope (22) and a section (23a) of a slope (23) have the same projection plane area when viewed from the source of vapor deposition, and the respective amounts of aluminum scattered to the two sections (22a, 23a) are the same. However, as the section (22a) has a larger effective area, e.g., four times that of the section (23a), the thickness of the film by the vapor deposition of the section (22a) is one fourth that of the section (23a). That is, in the vapor deposition to the jagged structure made of the two slopes (22, 23), the thicknesses of deposited films differ in accordance with the angles of the two slopes (22, 23).

Figure 6:
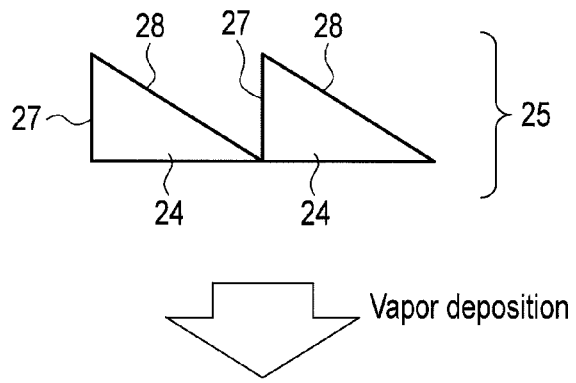
FIG. 6 is a diagram for illustrating another method for manufacturing reflectors of a unisometric reflection display.
Figure 6:
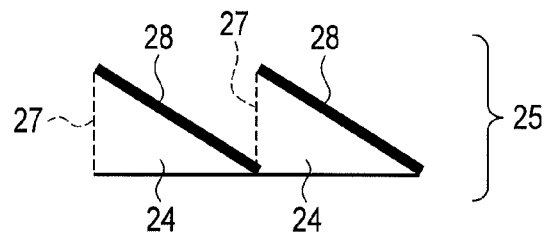

FIG. 6 is a diagram for describing another manufacturing method of the inclining reflectors.

A saw-blade-shaped jagged structure (25) with convex portions each made of a vertical plane (27) and a slope (28) is formed by the same method as the above-mentioned method, and then aluminum is deposited on a surface of the structure (25) by vacuum deposition.

It is assumed that the vertical planes (27) are parallel with the vacuum deposition direction, and therefore do not have aluminum deposited thereon. However, in actuality, even with vacuum deposition, aluminum vapor does not travel in an absolutely straight line, i.e., the ability to travel in a straight line varies to some degree, and therefore aluminum is slightly deposited on the vertical planes (27). When aluminum is deposited on the vertical planes (27), it prevents light from passing through them in accordance with the above-mentioned optical paths 2 and 3 to result in a decreased transmissivity of light.

Figure 7:
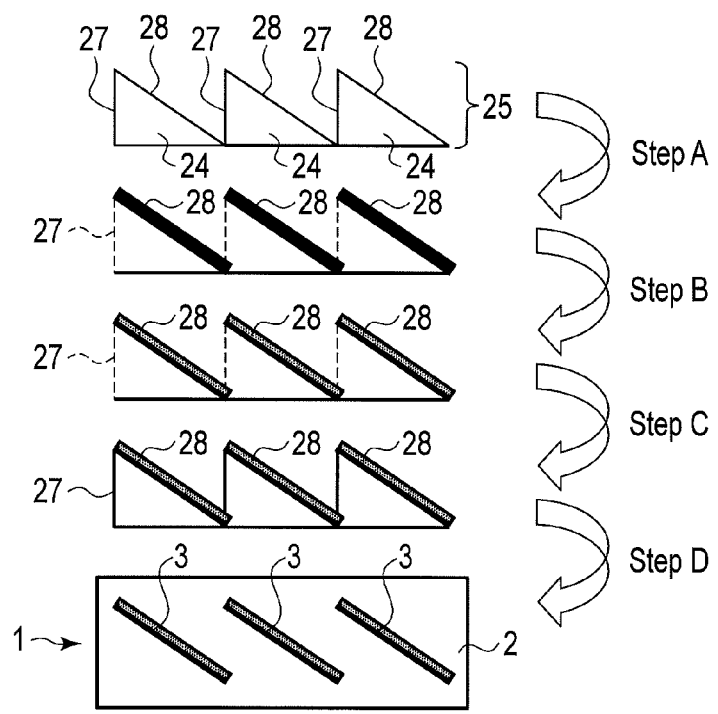
FIG. 7 is a process chart for illustrating a process for forming inclining reflectors.

A method for addressing such inconvenience will be described with reference to FIG. 7.

A saw-blade-shaped jagged structure (25) with convex portions each made of a vertical plane (27) and a slope (28) is formed by the same method as the above-mentioned method, and then aluminum is deposited on a surface of the structure (25) by the vacuum deposition as process (A). This results in formation of aluminum films of a necessary thickness on the slopes (28) and aluminum slightly deposited on the vertical planes (27).

Then, magnesium fluoride as a metallic compound as a protective layer for aluminum is vacuum-deposited on the surface of the jagged structure (25) as process (B). With this process, magnesium fluoride films are formed on the slopes (28), but not on the vertical planes (27). Note that aluminum can be dissolved with an alkali solution and magnesium fluoride is not solved into an alkali solution.

The jagged structure (25) on which the stack of aluminum and magnesium fluoride is deposited is soaked in an alkali solution as process (C). As a result, on the vertical planes (27) in which the aluminum film and the magnesium fluoride film are discontinuous, the aluminum is alkali-etched to result in only aluminum films remaining on the slopes (28) with the magnesium fluoride protective films.

Then, as process (D), a resin is wet-coated on the jagged portions of the jagged structure (25), thereby the unisometric reflection display (1) in which the reflectors (3) of the aluminum films are placed in the reflector holding layer (2) can be obtained.

Figure 8:
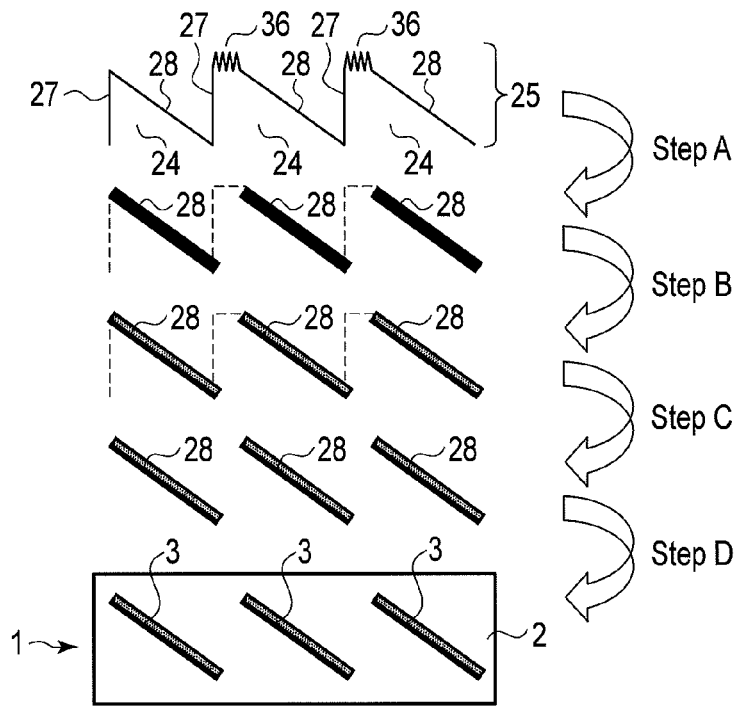
FIG. 8 is a process chart for illustrating a process for providing transparent intervals among reflectors.

FIG. 8 is the chart of a process for providing transparent intervals among reflectors.

The jagged structure (25) of a saw blade shape which has convex portions (24) each made of a vertical plane (27) and a slope (28) has fine jagged structural faces (36) between the vertical plane (27) and the slope (28) of each convex portion (24). It is utilized that the fine jagged structural faces (36) have larger surface areas than those of the slopes (28) because of fine jagged shapes, which result in deposited films much thinner than on the slopes (28).

Specifically, aluminum is vacuum-deposited on a surface of the jagged structure (25) as process (A), for example. This results in formation of aluminum films on the slopes (28), and aluminum slightly deposited on the vertical planes (27) and the fine jagged structural faces (36).

Then, magnesium fluoride as a protective layer for aluminum is vacuum-deposited as process (B). As a result, magnesium fluoride films are formed on the aluminum films on the slopes (28). Note that aluminum can be dissolved with an alkali solution and magnesium fluoride is not solved into an alkali solution.

Then, the jagged structure (25) on which the stack of aluminum and magnesium fluoride is deposited on slopes (28) is soaked in an alkali solution as process (C). As a result, on the vertical planes (27) and fine jagged structural face (36) in which the aluminum film and the magnesium fluoride film are broken, the aluminum is alkali-etched, and as a result aluminum films with the magnesium fluoride protective films remain only on the slopes (28).

Then, as process (D), a resin is wet-coated on the jagged portions of the jagged structure (25), thereby the unisometric reflection display (1) in which the reflectors (3) of the aluminum films are placed in the reflector holding layer (2) and intervals among the reflectors (3) can be obtained.

When the intervals among the reflectors (3) are the same to result in generation of periodicity of 10 µm or less in reflectors (3), diffraction light occurs. In order to suppress a rainbow-colored diffraction light, the areas of fine jagged structural faces (36) may be provided with randomness to disrupt the periodicity of reflectors (3).

Figure 9:
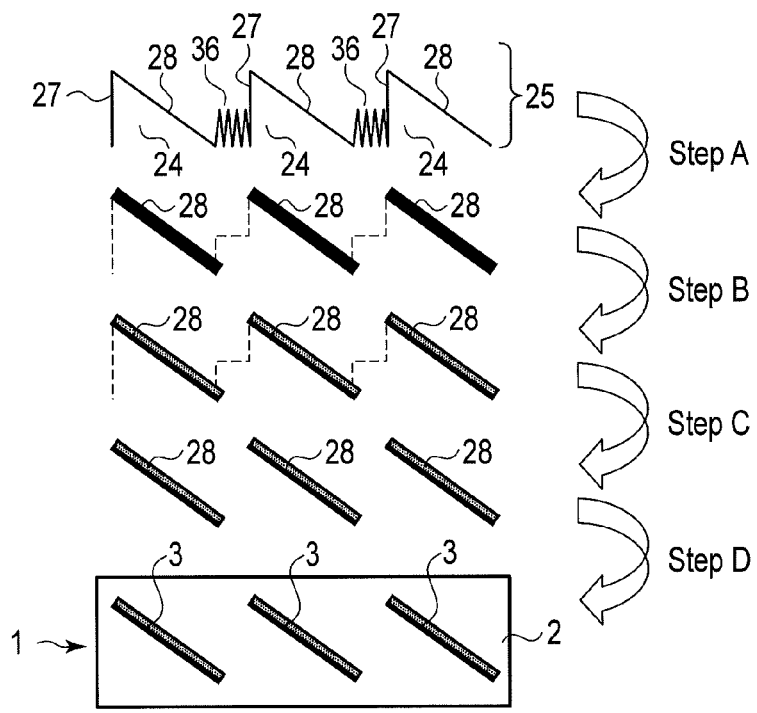
FIG. 9 is a process chart for illustrating another process for providing transparent intervals among reflectors.

FIG. 9 illustrates another chart of a process for providing transparent intervals among the reflectors, where a jagged structural face (36) different from the FIG. 8 case is used. Specifically, jagged structural faces (36) are provided between the bottom of the slope (28) of a convex portion (24) and the bottom of the vertical plane (27) of another convex portion (24) adjacent the first convex portion, and in such a state the same process as the FIG. 8 case is performed.

In the present invention, for a case of the reflector holding layer divided into at least two sections, the two sections may have the reflectors inclining differently in direction and/or angle from each other.

Moreover, the two sections may be joined by a transparent area without a reflector or by an area with a metallic reflection layer therein.

Furthermore, reflectors may be partly made of a metal or a metallic compound in part, and of a transparent reflection layer made of a high refraction material in another part, or reflectors may be made of a metal or a metallic compound with metallic luster and have an ability to reflect light.

The present invention includes a case where the reflectors are covered by transparent protective layers made of a metallic compound. Moreover, the present invention includes a case where, when viewed from the direction perpendicular to the plane surface of the reflector holding layer, inclining reflectors are placed not to overlap each other and have irregular intervals in the inclining direction to result in no regularity in positions of the reflectors.

FIG. 10 illustrates an example of use of the unisometric reflection displays of the present invention.

This unisometric reflection display (1) has two sections (50, 51) divided in the plane direction.

FIG. 11 is a sectional view of section a-b in FIG. 10.

The directions in which the reflectors (3) incline inside the reflector holding layer (2) are opposite each other in the section (50) and area (51). Particularly, the reflectors (3) in the section (50) incline to the lower left, or side "a", and the reflectors (3) in the area (51) incline to the lower right, or side "b".

Figure 12:
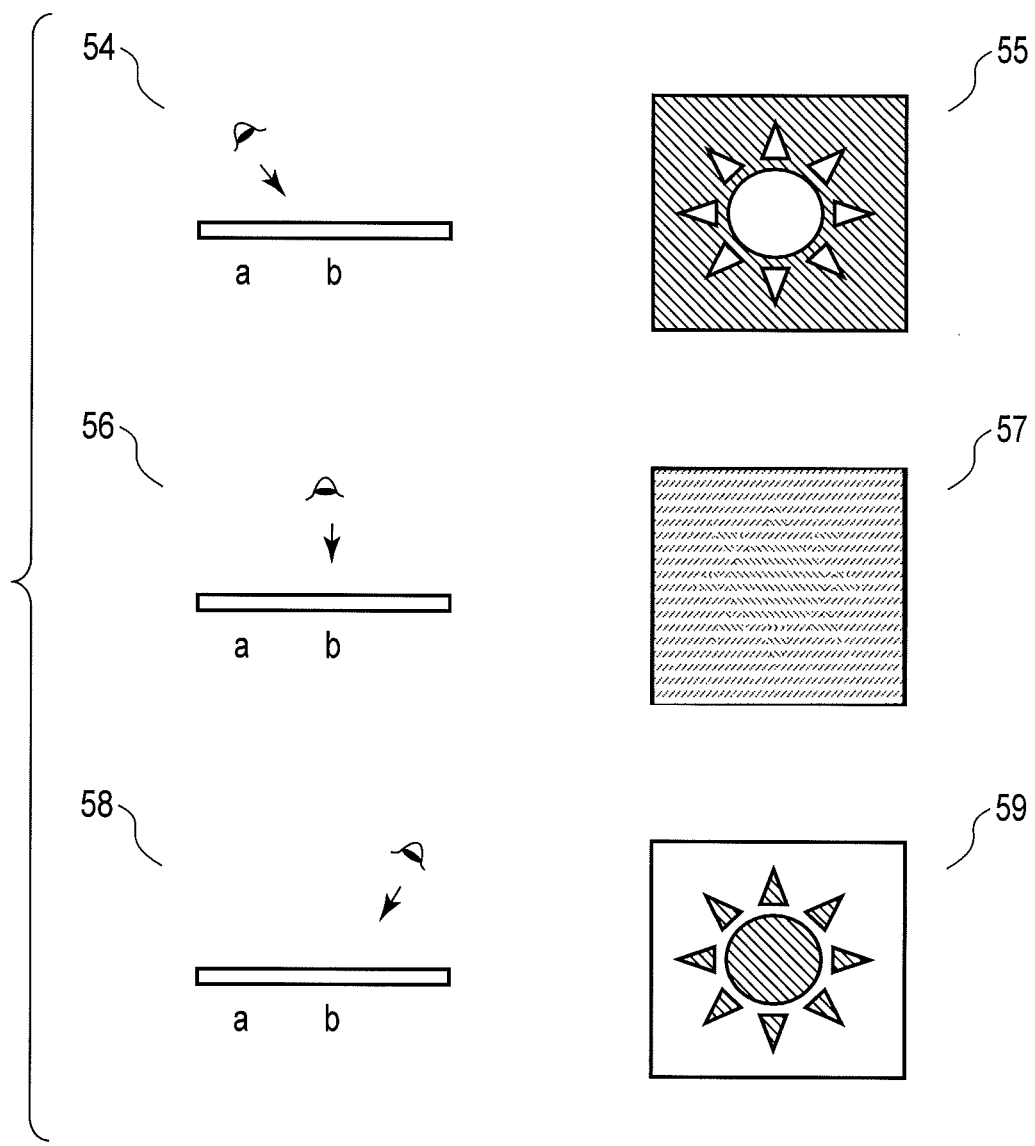
FIG. 12 is a schematic diagram illustrating the reflectivity of the unisometric reflection display of FIG. 10.

FIG. 12 is a schematic diagram showing the reflectivity of the unisometric reflection display (1) illustrated in FIG. 10.

Under an observation condition (54), a reflection image of the section (50) is visible, and a pattern (55) is observed.

Under an observation condition (56), reflection images of the section (50) and section (51) are invisible, but transparent appearance (57) is observed.

Under an observation condition (58), a reflection image of the section (50) is visible, and a pattern (59) is observed.

Figure 13:
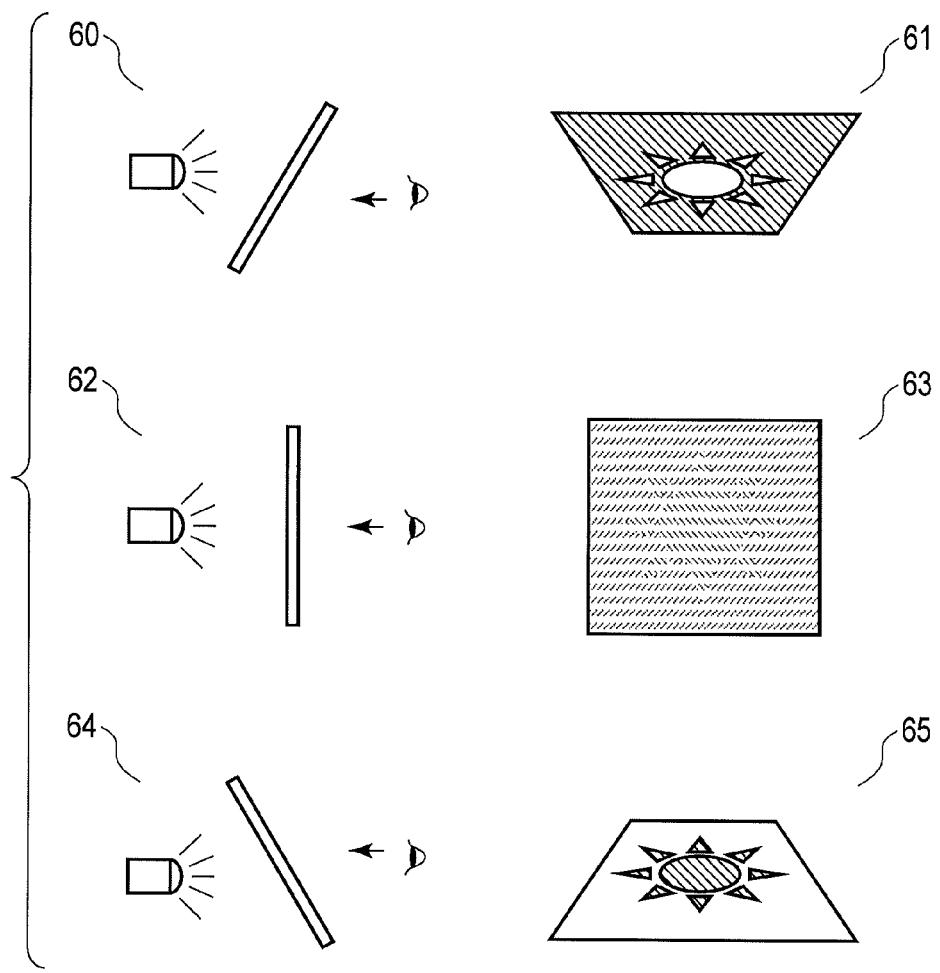
FIG. 13 is a schematic diagram illustrating the transmissivity of the unisometric reflection display of FIG. 10.

FIG. 13 is a schematic diagram illustrating the transmissivity of the unisometric reflection display (1) illustrated in FIG. 10.

Under an observation condition (60), a transmission image of the section (51) is visible, and a pattern (61) is observed.

Under an observation condition (62), both the section (50) and the section (51) are transmissive, and a whole transmission pattern (63) is visible.

Under an observation condition (64), a transmission image of the section (50) is visible, and a pattern (65) is observed.

Figure 14:
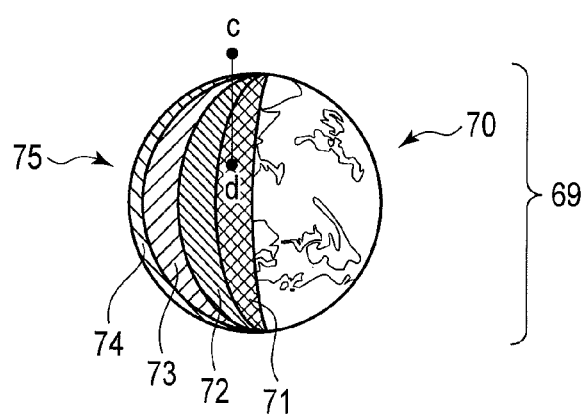
FIG. 14 is a plan view illustrating an information holder using a unisometric reflection display according to the embodiments of the present invention.

FIG. 14 illustrates a front view of an information holder which uses a unisometric reflection display according to the present invention.

This information holder (69) has a unisometric reflection display (75) which has a section (71), a section (72), a section (73), and a section (74), and a print layer (70).

Figure 15:
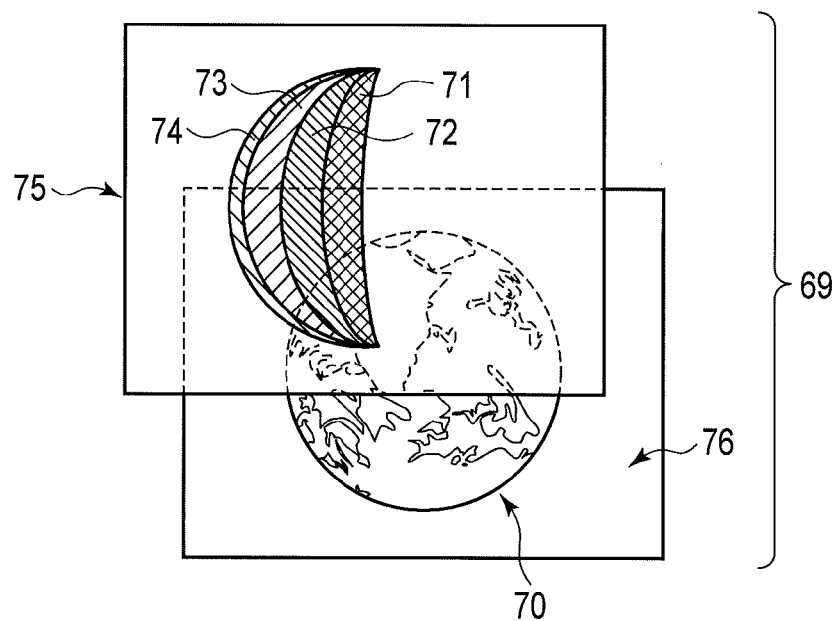
FIG. 15 is a diagram illustrating layers of the information holder.

FIG. 15 illustrates layers of the information recording holder (69) illustrated in FIG. 14. A unisometric reflection display (75), and a substrate (76) which has the print layer (70) printed by a transparent ink of cyanogen are stacked.

Figure 16:
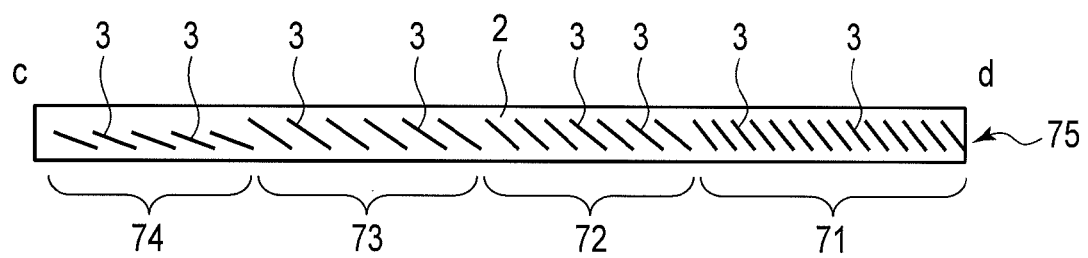
FIG. 16 is a sectional view of section c-d of the unisometric reflection display in FIG. 14.

FIG. 16 is a sectional view of section c-d of the unisometric reflection display (75) in FIG. 14. In the section (71), the section (72), the section (73), and the section (74), the reflectors (3) in the reflector holding layer (2) are arranged to gradually vary in inclining angle thereof to allow the reflection images to appear at different angles.

Figure 17:
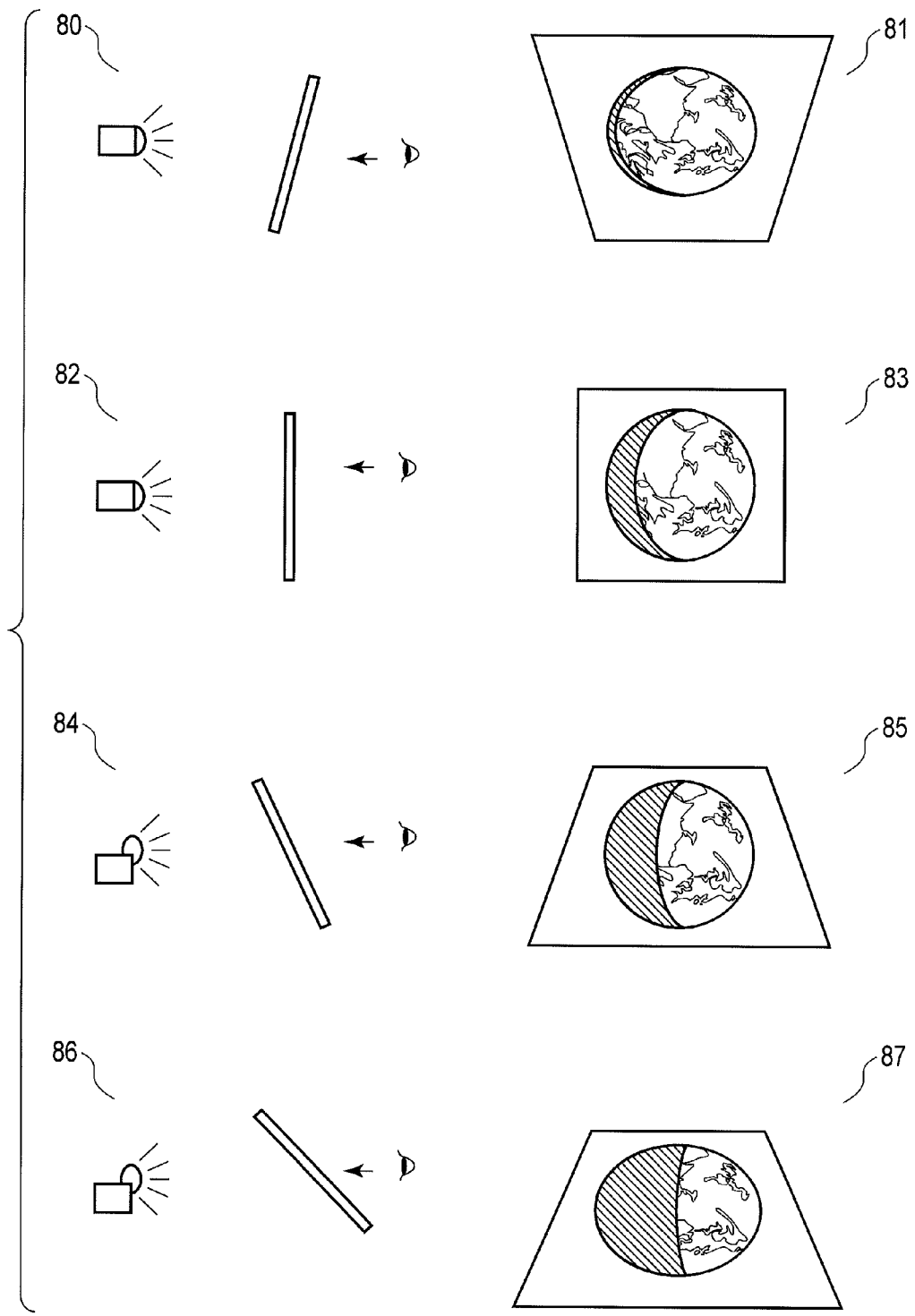
FIG. 17 is a schematic diagram illustrating the transmissivity of the information holder of FIG. 14.

FIG. 17 is a schematic diagram illustrating the transmissivity of the information holder (69) illustrated in FIG. 14.

Under an observation condition (80), transmitted light is blocked in the section (74) and transmitted light in the sections (73, 72, 71) allows an earth image of a transparent ink to be seen, which results in a pattern (81) observed.

Under an observation condition (82), transmitted light is blocked in sections (74, 73) and transmitted light in the sections (72, 71) allows the earth image of transparent ink to be seen, which results in pattern (83) observed.

Under an observation condition (84), transmitted light is blocked in sections (74, 73, 72) and transmitted light in the section (71) allows the earth image of transparent ink to be seen, which results in a pattern (87) observed.

Under an observation condition (86), transmitted light is blocked in sections (74, 73, 72, 71) and transmitted light in a section without a reflector (3) allows the earth image of transparent ink to be seen, which results in a pattern (87) observed.

The layers, the materials, and processes will now be described in detail.

(Details of a Manufacturing Process of a Fine Jagged Structure with a Saw-blade-shape)

As typical techniques of reproducing resin molded products with consecutive fine jagged patterns in large quantities, "the heat embossing method", "the cast method", "the photopolymer method", etc. are possible.

Among them, with "the photopolymer method" (or, the 2P method, or the photosensitive resin method), a radiation-curable resin is poured between a relief mold (a mold for reproducing fine jagged patterns) and a flat substrate (a plastic film, etc.), and then cured with radiation, followed by removal of the cured film from the substrate mold, which is used for reproducing in units of substrates, thereby obtaining fine jagged patterns. Moreover, optical elements obtained by such a method have jagged patterns with a higher accuracy than "the pressing method" and "the cast method" which use a thermoplastic resin, and is excellent in heat resistance or chemical resistance. Other manufacturing methods are also available, such as a method using a photocurable resin which is solid or highly viscous at normal temperatures for molding, and a method of adding a parting agent.

As examples of the material used for a fine-jaggedness formation layer, which is the reflector holding layer but will be referred to as the fine-jaggedness formation layer in the description for manufacturing methods, thermoplastic resins, such as an acrylics resin, an epoxy resin, a cellulose resin, and a vinyl resin; an urethane resin obtained by adding polyisocyanate as a crosslinking agent to acrylic polyol or polyester polyol with reactant hydroxyl group and then crosslinking it; thermosetting resins, such as a melamine system resin, an epoxy resin, and a phenol system resin can be used alone or in combination. Moreover, materials other than those described above can be suitably used as long as they can form the jaggedness.

As the material of the fine-jaggedness formation layer in the photopolymer method, a monomer, an oligomer, or a polymer, etc. with ethylene unsaturated bond or an ethylene unsaturated group can be used. The monomer can be, for example, 1,6-hexanediol, neopentylglycol diacrylate, trimethylolpropane triactylate, pentaerythritol triacrylate, pentaerythritol tetraacrylate, dipentaerythritol pentaacrylate, or dipentaerythritol hexaacrylate, etc. The oligomer can be epoxy acrylate, urethane acrylate, or polyester acrylates, etc. The polymer can be a urethane denaturation acrylate resin or an epoxy denaturation acrylate resin, but they are not limitative.

Moreover, when photocationic polymerization is used, a monomer or an oligomer or polymer with an epoxy group, a compound containing an oxetane skeleton, or vinyl ether can be used. Moreover, the above ionizing radiation-curable resin can be added with a photopolymerization initiator when it is cured by light, such as ultraviolet light. In accordance with the resin, a photoradical polymerization initiator or a photocationic polymerization initiator, or the combination thereof (hybrid type) can be selected.

Furthermore, a mixture of a monomer, an oligomer, and polymer, etc. with an ethylene unsaturated bond or an ethylene unsaturated group can be used, or such can be provided with a reaction group in advance and cross-linked with each other or with other resin skeletons by an isocyanate compound, a silane coupling agent, an organic titanate cross linking agent, an organic zirconium cross linking agent, organic aluminate, etc. With such a method, it is possible to obtain a polymer with an ethylene unsaturated bond or an ethylene unsaturated group and with a good molding ability and little contamination by the mold due to its solid state at normal temperatures and low tackiness.

The photoradical polymerization initiator can be, for example, benzoin system compounds, such as benzoin, benzoin methyl ether, and benzoin ethyl ether; anthraquinone system compounds, such as anthraquinone and methylanthraquinone; phenyl ketone system compounds, such acetophenone, diethoxyacetophenone, benzophenone, hydroxyacetophenone, 1-hydroxycyclohexylphenyl ketone, [alpha]-aminoacetophenone, and 2-methyl-1-(4-methylthiophenyl)-2-morpholino propane-1-one; benzyl dimethyl ketal, thioxanthone, acylphosphine oxide, or Michler's ketone, etc.

For a case of using a compound which can be photocationic-polymerized, as a photocationic polymerization initiator, an aromatic diazonium salt, an aromatic iodonium salt, an aromatic sulfonium salt, an aromatic phosphonium salt, a mixed ligand metal salt, etc. can be used. For a case of what is a called hybrid material with which both photoradical polymerization and photocationic polymerization are used, a mixture of respective polymerization initiators can be used, or an aromatic iodonium salt or aromatic sulfonium salt, etc. which alone can initiate both polymerizations with one initiator can be used.

The composition of radiation-curable resin and a photopolymerization initiator can be suitably determined in accordance with the material, and in general it is possible to add the photopolymerization initiator of 0.1 to 15 weight percent. To the resin composite, a sensitizing dye can be used in combination with the photopolymerization initiator. Moreover, dyes, a pigment, various additives (a polymerization inhibitor, a leveling agent, a defoaming agent, an anti-sagging agent, an adhesion improver, a painted surface modifier, a plasticizer, a nitrogen-containing compound, etc.), and a cross linking agent (for example, epoxy resin, etc.), etc. may be included if necessary. Moreover, a nonreactive resin (including an above-mentioned thermoplastic resin and thermosetting resin) can be added in order to improve moldability.

Moreover, materials may be selected which have a certain amount of liquidity to be moldable with an applied manufacturing method and which allow the molded coat to have a desired heat resistance and chemical resistance.

The coating method can be used to provide "the fine-jaggedness formation layer", where the material of "the fine-jaggedness formation layer" may be coated on a support substrate. In particular, wet coating allows for a low cost coating. Moreover, a solution diluted with a solvent may be coated and dried in order to adjust the thickness of the coated film.

The support substrate is preferably a film substrate. For example, films of plastics, such as polyethylene terephthalate (PET), polyethylenenaphthalate (PEN), and polypropylene (PP), can be used, and it is desirable to use a material resistant to changes in form and properties due to heat, pressure or electromagnetic waves applied during formation of the fine jagged patterns. Paper, synthetic paper, plastic multilayer paper, resin-containing paper, etc. may be used as the substrate if necessary.

The thickness of "the fine-jaggedness formation layer" is preferably 0.1 to 10 µm. Though depending on the manufacturing method, an excessively thick coated film would result in overflow of a resin or wrinkles, and an excessively thin coated film would lack the flowability to result in insufficient molding.

Although the moldability varies with the form of the desired fine jagged patterns, it is preferable to provide "the fine-jaggedness formation layer" of one to ten times, more preferably three to five times, as thick as the depth of the jaggedness.

"The fine-jaggedness formation layer" obtained is made to contact a "relief mold" in which a relief for a desired optical element is formed, and then heat, pressure or electromagnetic waves are used to transfer the form of the relief mold to one side of "the fine-jaggedness formation layer" if necessary. The relief form may be formed in the back and front sides of "the fine-jaggedness formation layer."

Known methods can be used to form the relief mold, and consecutive molding is possible when a roller mold is used.

(Reflectors)

The reflectors according to the present invention are made of a reflection film which covers only the slopes at the one side of a saw-blade-shaped jagged structure, and can reflect electromagnetic waves. In order to reflect the light which transmits through the reflector holding layer, a high refractive index material with a higher refraction index than that of the reflector holding layer can be used. In this case, the difference between the refractive indices of the both layers is preferably 0.2 or more. With the difference of the refractive indices of 0.2 or more, refraction and reflection take place at the interface between "the reflector holding layer (fine-jaggedness formation layer)" and "the reflection film." The reflection layer covered on the jagged structure for the optical element can emphasize optical effects through the structure thereof.

As a material of the reflection film, a single metallic material, such as Al, Sn, Cr, Ni, Cu, Au, and Ag, or a compound thereof are possible.

From among them, a material which changes in reflectivity or transmissivity by dissolution, corrosion, or quality change can be selected. In some cases, more than one material can be used.

As the method to change the reflectivity or transmissivity by the dissolution, a known method to perform an etching process to metal or metal oxide, etc. is possible. As a treatment agent used for the etching, a known acid or alkali and an organic solvent, an oxidizing agent, or a reducing agent, etc. can be used.

As the method to change the reflectivity or transmissivity by quality change, oxidizing copper by an oxidizing agent to change it into copper I oxide or oxidizing aluminum by an oxidizing agent to change it into boehmite is possible; however, the method is not limited to these.

Besides a dissolvability or a quality change characteristic, a material can be selected in accordance with optical properties, such as a refractive index, a reflectivity, and a transmissivity, or a durability during practical use, such as a weatherability, an adhesivity of layers, and can be formed in the form of a thin film.

The reflection layer needs to be formed in a thin film with a uniform surface density to the plane of the fine jaggedness formation layer, and therefore the dry coating method is desirable, and for example, known methods, such as the vacuum deposition method, the sputtering method, and CVD method, can be suitably used.

The transmissivity of a transparent reflection layer is 50% or more in a wavelength range (400 nm to 700 nm) because printed information positioned under the reflection layer, such as a photograph of a face, characters, a pattern, etc. can be identified in such a range.

The structure for forgery prevention of the present invention only needs to be visible at one of the side of the reflection layer and the side of the fine-jaggedness formation layer.

In the section with the transparent reflection layer provided, visible information can be provided under the reflection layer, which allows the necessary information and structure for forgery prevention to be stacked. Such a technique can be applied to oversheets, etc. for forgery prevention for, for example, ID cards, passports, etc.

(Transparent Protection Layer Made of a Metallic Compound)

The protection layer is resistive against or slow in dissolution to at least one liquid substance which dissolves "the reflection film" of the reflectors. The protection layer is formed as a thin film with a uniform surface density to the plane of the fine-jaggedness formation layer, similarly to the reflection layer. As a method for formation, it is possible to suitably use known dry coating methods with which a thickness of films, a rate of forming films, the number of films stacked, and an optical thickness, etc. can be controlled, such as the vacuum deposition method, CVD method and the sputtering method, etc. and the vacuum deposition is preferable when the ability for a vapor deposition materials to travel straight is taken into consideration. Any material can be used for the protection layer as long as it can be dry-coated. As examples, those described for the above-mentioned reflective material are possible; however such materials are not limitative.

Examples of materials which can be used as the transparent protection layer will be given below. The numerical value in the parenthesis following a chemical formula or a name of a compound described below indicates the refractive index n. As ceramics, $Sb_2O_3(3.0)$, $Fe_2O_3(2.7)$, $TiO_2$ (2.6), $CdS(2.6)$, $CeO_2(2.3)$, $ZnS(2.3)$, $PbCl_2(2.3)$, $CdO(2.2)$, $Sb_2O_3(5)$, $WO_3(5)$, $SiO(5)$, $Si_2O_3(2.5)$, $In_2O_3(2.0)$, $PbO$ (2.6), $Ta_2O_3(2.4)$, $ZnO(2.1)$, $ZrO_2(5)$, $MgO(1)$, $SiO_2(1.45)$, $Si_2O_2(10)$, $MgF_2(4)$, $CeF_3(1)$, $CaF_2(1.3-1.4)$, $AlF_3(1)$, $Al_2O_3(1)$, $GaO(2)$ are possible. As organic polymer, polyethylene (1.51), polypropylene (1.49), polytetrafluoroethylene (1.35), polymethylmethacrylate (1.49), and polystyrene (1.60), etc. are possible; however, such materials are not limitative. The thickness of the protection layer is preferably below half that of the reflection film. Such a thickness allows the protection film to be significantly thin (or discontinuous under some conditions) compared to a significantly thin reflection layer of the reflection film on the plane from which the reflection film of the reflectors is desirably removed and to have protection effects against the dissolution or quality change of the reflection layer in other areas.

Using such a quality of the material of the protection layer can increase the difference in etching rate between the slope on which the reflection film is left and the plane from which the reflection film is removed, which contributes to improvement of productivity and stabilization of the quality.

The thickness of the protection layer needs to be large enough to be continuous to protect the refection layer on the slope on which the reflection film is left, and, furthermore, is preferably very thin on "the slope from which the reflection film is removed" compared to the thickness of the protection layer on "the plane on which the protection film is left".

Such a structure allows inclining "reflectors" to be formed by the process of removing the reflection layer, such as etching.

(Substrate)

Pulp, cotton, or paper made with vegetable fibers, etc. and plastic films, such as vinyl chloride, polycarbonate, PP, PE, and PET, etc. are possible as examples; however, such materials are not limitative. A complex sheet of a stack of paper and plastic are also possible.

The substrate may be of a porous material in which first functional particles are impregnated, and, for example, a porous polyethylene film, paper, etc. used for synthetic paper, etc. can be given as examples.

(Ink Used for Print Layer)

The ink of the present invention can be added with, in addition to first functional particles, a scale material, and second functional particles, a resin component which fixes the particles and a scale material when the ink is applied and dried. The resin to be added may be a resin, such as vinyl acetate, vinyl chloride, polyester, urethane, polyamide, polyimide, an acrylic, PVA, an ionomer, and epoxy, and copolymerization and a mixture thereof, and such a resin structure can have a cross-linking group. The selection may be made in view of practicality, such as an adhesivity with the substrate, the sticking tendency of the first functionality particles, the scale material, and the second functionality grains, and durability. Moreover, an ultraviolet curable resin and an electron-ray curable resin may be used.

In order to dissolve and disperse these resin and the first functionality particles, the scale material, and the second functionality grains, a diluted solvent may be added.

Moreover, it is possible to perform a surface treatment to the first functionality particles, the scale material, and the second functionality particles in order to improve the dispersibility in ink and with cross-link solid materials.

As a surface treatment for improving the dispersibility, adding a functional group of sufficient compatibility to the solvent can be given as an example.

As a surface treatment to cross-link solid materials, it is possible to add, to part of the structure of the solid materials themselves, reaction groups, such as an isocyanate group, an epoxy group, a silanol group, a methylol group, and an imido group, and functional groups which react with them.

The substrate and ink used need to have light-transmissivity when transmittance is used to confirm the function of the unisometric reflection display.

Examples will now be described.

EXAMPLE 1

In order to make a unisometric reflection display according to the present invention by the photopolymer method, an ink composition of "the fine-jaggedness formation layer" for forming "the saw blade-shaped jagged structure" was prepared as illustrated below.

"Fine-jaggedness formation layer ink composition" (ultraviolet curable resin):

| | |
|---|---|
| urethane (meta) acrylate (polyfunctional, molecular weight 6,000) | 50.0 pts. wt |
| methyl ethyl ketone | 30.0 pts. wt |
| ethyl acetate | 20.0 pts. wt |
| optical initiator (IRGACURE 184 from a Chiba Speciality Chemicals) | 1.5 pts. wt |

As a method of forming a saw-blade-shaped jagged structure in the fine-jaggedness formation layer, the roll photopolymer method was used.

On a support made of a transparent polyethylene terephthalate (PET) film 23 μm thick, "the ink composition of the fine-jaggedness formation layer" was coated by the photogravure method to be 1 μm as a post-dry thickness. Then, mold processing was performed in which a cylindrical mold with a saw-blade-shape jagged structure was pressed with a pressing pressure of 2 kgf/cm$^2$, and press temperature of 80° C. and press speed of 10 m/min.

In parallel with the molding, ultraviolet radiation exposure was performed at 300 mJ/cm$^2$ by a high-pressure mercury-vapor lamp through the PET film to cure "the fine-jaggedness formation layer" as soon as the jagged shape of the mold was transferred thereto. "The saw-blade-shape jagged structure" in the fine-jaggedness formation layer after molding was 5 μm in depth, 30 μm in period, and had a saw-blade-shape jagged structure made of vertical planes and slopes.

Then, aluminum was vacuum-deposited all over the fine-jaggedness formation layer to make it 50 nm in thickness in a smooth plane section to provide a reflection layer, and furthermore magnesium fluoride was vacuum-deposited all over the fine-jaggedness formation layer to make it 20 nm in thickness in the smooth plane section to provide a protection layer. Then, the aluminum reflection layer was etched, "the fine-jaggedness formation layer ink composition" (ultraviolet curable resin) was applied to the jagged surface, and ultraviolet radiation exposure of 300 mJ/cm$^2$ was performed with a high-pressure mercury-vapor lamp under a nitrogen purge environment to execute drying to obtain a reflector holding layer, thereby a unisometric reflection display was obtained.

EXAMPLE 2

A similar formation method as in example 1 was performed up to the vacuum deposition of the aluminum, and then without performing vacuum evaporation of the protection layer or alkali etching, "the fine-jaggedness formation layer ink composition" (ultraviolet curable resin) was applied to the jagged surface. Then, an ultraviolet radiation exposure of 300 mJ/cm$^2$ was performed with a high-pressure mercury-vapor lamp under a nitrogen purge environment to obtain the reflector holding layer, thereby a unisometric reflection display was obtained.

COMPARATIVE EXAMPLE 1

Acicular goethite (FeOOH) with a major axis of 0.8 μm, acicular ratio of 10:1, and BET specific surface area of 45 m$^3$/g of was suspended in a superfluous sodium hydroxide solution, heated at 250° C. for two hours in an autoclave, taken out, washed in cold water and dried, thereby tabular α-iron oxide was obtained. These α-iron oxide particles were 10 μm in plane radius and 20:1 in ratio of plane radius to thickness, and tabular particles of a regular hexagon. The tabular α-iron-iron-oxide-particle powder was put into a stainless steel pipe, and heated at 220° C. for two hours while hydrogen gas was supplied. The gas was replaced with nitrogen gas, cooling to room temperature was carried out, and it then was taken out, thereby obtaining a dark purple brown powder. This powder had the same form and size as the starting material of α-iron oxide, and exhibited a saturation magnetic moment (δs) of 20 emu/g. The thus-obtained powder of 5 pts. wt and two-component acrylic urethane coating (transparent) of 100 pts. wt (of solid resin content) was mixed and agitated, thereby a pigment-dispersed coating was made. This coating was applied to a transparent plastic plate (1 mm thick) to be 15 to 20 μm in thickness (solid content), and, to the plate undried, a flexible magnet plate (1 mm thick) from which a pattern was cut out was stuck and dried in this state, and the flexible magnet plate was removed, thereby a coated item was obtained. With the coated item, a display for comparative example could be formed which had a smooth and high-contrast three-dimensional pattern (purple brown) of a shape in accordance with the flexible magnet.

[Evaluation Method of Forgery-preventive Structure Created in Examples and Comparative Example]

<Evaluation for Transmissivity>

An ink jet printer was used to print whole black "TP" in size 16 Mincho font on fine printing paper to form a print layer, the fine paper with the print was placed under the display formed by examples 1 and 2 and comparative example 1, and the visibilities of the print through the display were evaluated.

When the print was clearly visible from an angle, it was "O.K.", and when the print was not clearly visible from any angle, it was "NG".

<Evaluation for Reflectivity>

An ink jet printer was used to print whole black "TP" in size 16 Mincho font on fine printing paper to form a print layer, the fine paper with the print was placed under the display formed by examples 1 and 2 and comparative example 1, and the visibilities of the print through the display were evaluated.

When the display performed reflection through observation from an angle and the print was not clearly readable, it was "OK", and when the print could only be slightly identified from any angle, it was "NG".

The above evaluation methods were used to evaluate the examples and comparative example, the results of which are summarized in Table 1.

TABLE 1

| Case | Transmissivity | Reflectivity |
| --- | --- | --- |
| Example 1 | OK | OK |
| Example 2 | OK | OK |
| Comparative example 1 | NG | NG |

As can be seen from Table 1, transmissivity and reflectivity were compatible in the examples, whereas both transmissivity and reflectivity of the comparative example were insufficient.

According to the present invention, it is possible to provide a unisometric reflection display and an information holder with a transmissivity which allows a print layer on which unique information of an item is described to be observed easily even through the display and with an ability to provide a special high optical effect with a high contrast and visibility, which can be used for ID cards, passports, and bills which require a high forgery-prevention effect.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information holder comprising:
an unisometric reflection display and a print layer which are stacked, the unisometric reflection display having a light transmissivity and including a reflector holding layer of a thin film form, wherein
the reflector holding layer is divided, along a plane direction of the reflector holding layer, into a plurality of sections,
each of the plurality of sections includes reflectors, each of the reflectors being inclined in a fixed direction and in a fixed inclination angle with respect to a plane of the reflector holding layer,
for each of the plurality of sections, the inclination angles of the reflectors in the section are a same,
the inclination angles of the reflectors of the plurality of sections gradually vary from section to section of the plurality of sections,
the reflectors are made of a metal, and are covered with a protection layer made of a metallic compound or ceramics,
light incident from a first direction is reflected on a front surface of a reflector to be inhibited from transmitting through the reflector holding layer, and
light incident from a second direction to one of the reflectors is reflected on a front surface of the one of the reflectors and a rear surface of another of the reflectors adjacent the one of the reflector at a front surface side, or reflected this way a plurality of times to transmit through the reflector holding layer.

2. The information holder of claim 1, wherein part of the reflectors is metal or a metallic compound, and another part of the reflectors is a transparent reflection layer made of a transparent highly-reflective material.

3. The information holder of claim 1, wherein inclining reflectors are arranged not to overlap with each other when observed from a direction perpendicular to the plane of the reflector holding layer.

4. The information holder of claim 1, wherein, of the inclining reflectors, an interval of the reflectors in an inclining direction is not constant and no periodicity is formed in position of the reflectors.

5. The information holder of claim 1, wherein, in at least one section of the reflector holding layer, a reflectivity when observed from a first direction is 80% or more, and a transmissivity when observed from a second direction is 50% or more.

6. The information holder of claim 1, wherein, in at least one section of the reflector holding layer, a transmissivity when observed from a direction perpendicular to the plane of the reflector holding layer is 50% or more.

7. The information holder of claim 1, wherein, in at least one section of the unisometric reflection display, a transmissivity when observed from a direction perpendicular to the plane of the reflector holding layer is 50% or more.

* * * * *